United States Patent Office 3,669,718
Patented June 13, 1972

3,669,718
SOLVENT RESISTANT ALKENYL AROMATIC RESINOUS SHAPED ARTICLE
Thomas T. Chiu, Midland, Kenneth R. Hock, Gladwin, and Floyd B. Nagle, Midland, Mich., assignors to The Dow Chemical Company, Midland, Mich.
No Drawing. Filed Oct. 28, 1969, Ser. No. 871,946
Int. Cl. B32b 27/30
U.S. Cl. 117—72
8 Claims

ABSTRACT OF THE DISCLOSURE

Polystyrene-type resinous articles are provided with a protective coating of a styrene or vinyl ether maleic anhydride copolymer salt which provides a solvent resistant coating and prevents stress cracking and softening of the styrene-type article.

---

This invention relates to coated alkenyl aromatic resinous shaped articles, and more particularly relates to alkenyl aromatic resinous shaped articles having a coating of a copolymer, the copolymer consisting essentially of a water soluble salt of a copolymer of styrene and maleic anhydride. The invention is particularly adapted to be practiced with integral solid styrene polymer film, sheets or foam either having biaxial molecular orientation, molded, vacuum formed or otherwise shaped. Such a polymer is employed herein as being generally representative of alkenyl aromatic compounds of the type that contain at least about 50 weight percent of at least one polymerized alkenyl aromatic compound or monomer having the general formula Ar—CR=CH$_2$, wherein R is hydrogen or methyl and Ar is an aromatic radical, advantageously of the benzene series, of from 6 to 10 carbon atoms (including the carbon atoms in any ring substituents on the aromatic nucleus). Thermoplastic polymers and copolymers of styrene and polymers and copolymers of α-methyl styrene, Ar-methyl styrene (or vinyl toluene), the several mono- and dichlorostyrenes and Ar-dimethyl styrenes, including copolymers thereof with such materials as vinylidene chloride and acrylonitrile; and graft copolymers with other polymeric substances (such as other elastomeric polymers) may frequently be utilized with benefits commensurate with or in excess of those which are derivable from employment of polystyrene alone.

Flexible film may be prepared from the above-described thermoplastic materials by thermofabrication, specifically extrusion. Process, techniques and apparatus for such fabrication are known. Other techniques include solvent casting the polymeric composition from a volatile solvent followed by evaporation of the solvent. Flexible film from these alkenyl aromatic resins may be prepared at a wide variety of gauges, colors and widths. As commercially available, such films are sold in thicknesses of from 0.0003 to about 0.015 inch. Since the modifications contemplated by this invention involve primary surface phenomena, they are adaptable to any size, shape or thickness where uniform coating may be applied. The modifications are also useful with other moldings, extrusions or any other thick section of a rigid or semi-rigid nature. Alkenyl aromatic resinous shaped articles including sheet and film, injection moldings, foam articles and the like are particularly susceptible to marring by solvent attack. Such a characteristic is relatively undesirable in many fabricated products, as the clarity is usually reduced with use, particularly those articles employed in the fields of packaging and decoration as well as many utilitarian applications wherein the properties of transparency and clarity of surface are of great importance. Such material has not been suitable for many applications because of the tendency to scratch and scar or it has been employed in applications where only relatively mild abrasion or scratching conditions are expected to exist and the useful life of the article is relatively short.

Alkenyl aromatic resinous articles or styrene-type polymers are often damaged by contact with many of the common solvents, greases, oils, fuels or liquid organic chemicals such as are employed in refrigeration. Paints, lacquers, other liquid coating compositions, hydrocarbon solvents such as gasoline, grease, fatty foods such as oleomargarine and butter as well as cooking oils and the like, frequently promote softening or crazing or solution of the styrene polymer article.

It would be desirable if there were available an improved alkenyl aromatic resinous film which is scratch resistant and resistant to substances which tend to dissolve or otherwise harm the alkenyl aromatic resinous polymer.

It would also be desirable if there were available an improved alkenyl aromatic resinous article which could be coated with coating compositions normally deleterious to such alkenyl aromatic resins.

It would also be desirable if there were available an improved method for the decoration of alkenyl aromatic resins.

It would further be desirable if there were available an improved package comprising an alkenyl aromatic resinous container in contact with an organic substance normally deleterious thereto.

These benefits and other advantages in accordance with the present invention are achieved in an improved alkenyl aromatic resinous article which comprises an article of alkenyl aromatic resinous material having disposed on at least a portion of the surface thereof and adhering thereto a continuous coating of a water soluble material selected from the group consisting of monovinyl aromatic-maleic anhydride polymer salt, vinyl alkyl ether-maleic anhydride copolymer salt, and mixtures thereof, wherein the coating weight of the salt is from about 10 to about 150 milligrams per square foot.

Also contemplated within the scope of the present invention are shaped articles as hereinbefore delineated in contact with organic liquids normally deleterious to the organic substrate.

Further contemplated within the scope of the present invention is a method of applying a coating to the shaped alkenyl aromatic resinous article, the steps of the method comprising applying to the alkenyl aromatic resinous article an aqueous coating of a water soluble salt of a copolymer selected from the group consisting of a polymer of a monovinyl aromatic compound and maleic anhydride, vinyl alkyl ether-maleic anhydride copolymer and mixtures thereof, removing water from the copolymer coating to provide a continuous adherent film having a coating weight of from about 10 to about 150 milligrams per square foot, subsequently applying a coating composition having a vehicle which is deleterious to alkenyl aromatic resinous polymer, subsequently converting the coating to a non-deleterious form.

Monovinyl aromatic compound-maleic anhydride-type polymers useful in the practice of the present invention are alkali metal or ammonium salts of vinyl aromatic-maleic anhydride copolymers which are soluble in water to provide a solution of at least 0.25 weight percent at 25° C. Typical vinyl aromatic compositions which are suitable in the copolymer composition include styrene, vinyl toluene, p-butylstyrene, chlorostyrene, dichlorostyrene and the like; that is, monovinyl aromatic compounds and a vinyl group attached directly to the benzene ring and having not over 12 carbon atoms. Such copolymers are well known in the art and are described in U.S. 2,607,762 and 2,872,436, and a method for the preparation of non-equimolar copolymers is set forth in U.S. 2,769,804; the teachings of the foregoing patents being incorporated herein by reference.

Also of benefit in the present invention are copolymers of vinyl alkyl ethers and maleic anhydride where the alkyl group contains up to 4 carbon atoms; such as methyl vinyl ether, ethyl vinyl ether, propyl vinyl ether and butyl vinyl ether.

The copolymers useful in the present invention contain at least 20 mole percent maleic anhydride, and beneficially at least 25 mole percent maleic anhydride. The coating compositions for use in the practice of the present invention are readily prepared by dissolving or preparing such polymer in water. However, the monovinyl aromatic compound-maleic anhydride polymer typified by 1:1 molar styrene maleic anhydride polymers is available in granular form or as a solution in an organic solvent. Suitable coating solutions have been prepared by dissolving the dried polymer in a dilute solution of an alkali metal hydride or a solution of ammonia in water. Beneficially, if the polymer is in the anhydride form hydrolysis occurs to provide the desired salt form. Suitable hydroxides are potassium hydroxide, sodium hydroxide and the like. Coating compositions are applied to alkenyl aromatic resinous shaped articles by a convenient method such as rolling, brushing, dipping, spraying. Often it is desirable to include in the coating composition a minor portion (based on the weight of the polymer) of a wetting agent such as sodium oleate, alkylphenylpolyethoxyethanol to provide uniform wetting of the surface of the article with minimal effort. Beneficially, the water is removed from the aqueous coating composition in contact with the alkenyl aromatic resinous shaped article by contact with air, heated air or the like. Coated articles in accordance with the present invention find wide use in that they are remarkably resistant to a wide variety of agents which induce stress cracking, crazing, softening or solution of the alkenyl aromatic polymer.

Employing an article coated as described herein, the coated surface may be dried to form a continuous and adherent film. The surface may be coated with lacquers, paints and similar coating materials which contain the vehicle which normally attacks the alkenyl aromatic resinous article; for example, such molded articles as decorative linings, plastic housings for television and radio sets. Automotive, aircraft and marine components are readily painted with lacquers or paints containing relatively high proportions of toluene and the like which readily attack concentrated styrene-type polymer structures. Coated articles are also beneficial in an automotive interior and in marine applications where resistance to contact with grease and gasoline vapor is desired. Shaped articles in accordance with the present invention beneficially also exhibit a significant resistance to low volatile agents such as butter, oleomargarine and grease which induce stress cracking.

The following examples illustrate the manner in which the principles of the invention are applied but are not to be construed as limiting the scope of the invention.

EXAMPLE 1

Three polystyrene foamed cups coated with a 5 weight percent solution of the potassium salt of a 1:1 molar copolymer of styrene and maleic anhydride and dried at about 25° C. to provide coating weights of 100 milligrams per square foot of the copolymer on the surface of the three cups. To each of the three coated cups and to three uncoated cups is added 50 grams of a 100 percent corn oil margarine commercially available under the trade designation "Parkay." The six cups are placed in a forced air oven and maintained at a temperature of 60° C. At the end of 10 days in the forced air oven, the uncoated cups show signs of attack and are leaking liquefied corn oil margarine. The coated cups show no sign of attack.

EXAMPLE 2

Rubber-modified polystyrene sheets containing about 5 weight percent rubber commercially available under the trade designation "Styron 475B" are cut to a width of 1.8 inches and a length of 7 inches. The sheets are 7 mils thick. Some of the sheets are coated with varying amounts of the potassium salt of a 1:1 molar polymer of styrene and maleic anhydride. The aqueous solutions contain .2 weight percent of a non-ionic surface active agent (nonylphenylpolyethoxyethanol) commercially available under the trade designation of "Triton X-100," based on the weight of the polymer. The surface active agent is added to cause more rapid wetting of the surface by the coating. A plurality of strips are coated (the concentration of the wetting solution and coating weights are set forth in Table I) and dipped in trichlorofluoromethane for 5 seconds. The strips on removal vary from badly blistered and increased thickness to essentially unchanged.

TABLE I

| Concentration of polymer in solution for coating, percent | Coating weight * | After exposure | |
|---|---|---|---|
| | | Thickness of sheet (mils) | Visual appearance |
| 0 | 0 | 15 | Badly blistered. |
| 0.5 | 10 | 7 | Slightly rough. |
| 1.0 | 20 | 7 | Increased haze. |
| 2.0 | 40 | 7 | Essentially unchanged. |

* Milligrams per square foot.

EXAMPLE 3

The procedure of Example 2 is repeated with the exception that other maleate copolymer salts are employed and the results are set forth in Table II.

TABLE II

| Concentration of polymer in solution for coating, percent | Coating weight * | After exposure | |
|---|---|---|---|
| | | Thickness of sheet (mils) | Visual appearance |
| No coating; control; 7 mils thick | | 7 | Badly blistered. |
| 0.5% in A [1] | 10 | 7 | Slightly rough. |
| 1.0% in A | 20 | 7 | Increased haze. |
| 2.0% in A | 40 | 7 | Essentially unchanged. |
| 2.0% in B [2] | 40 | 7 | Do. |
| 2.0% in C [3] | 40 | 7 | Increased haze. |
| 2.0% in D [4] | 40 | 7 | Slightly rough. |
| 2.0% in E [5] | 40 | 7 | Increased haze. |
| 2.0% in F [6] | 40 | 7 | Do. |

* Milligrams per square foot.
[1] Solution A—equimolar styrene maleic anhydride copolymer potassium salt, the styrene maleic anhydride copolymer having a solution viscosity of 31 centipoise as a 10 percent solution in methyl ethyl ketone at 10 °C.; the coating solution containing 20 weight percent, based on the polymer, of Triton X-100.
[2] Solution B—copolymer of potassium salt of styrene maleic anyhdride copolymer, 1.5 moles of styrene per mole of maleic anhydride; solution viscosity of 22 centipoise; 10 weight percent, based on the polymer, Triton X-100 in the coating solution.
[3] Solution C—potassium salt of styrene maleic anhydride copolymer having two moles of styrene per mole of maleic anhydride; solution viscosity 2 centipoise as a 10 percent solution in methyl ethyl ketone at 25 °C.; 10 weight percent Triton X-100 in coating solution based on polymer.
[4] Solution D—1:1 molar copolymer of tertiarybutylstyrene and maleic anhydride potassium salt; 20 weight percent Triton X-100 in coating solution, based on polymer.
[5] Solution E—1:1 copolymer of o-chlorostyrene and maleic anhydride potassium salt; 20 weight percent Triton X-100 in coating solution based on the polymer.
[6] Solution F—1:1 molar copolymer of vinyl methyl ether and maleic anhydride potassium salt; 20 weight percent Triton X-100 in coating solution based on the polymer.

EXAMPLE 4

A plurality of polystyrene bottles having a diameter of 1⅝ inches, a height of 2¼ inches and a wall thickness of 1/16 inch are coated on the inside with the coating solution of Example 2 to give a dry coating weight of about 100 milligrams per square foot. A coated and an uncoated bottle are each filled with 34 grams of gasoline at about 25° C. Visual observation of the uncoated bottle shows immediate crazing, and after a period of 25 hours at room temperature the wall of the bottle appears to be badly softened and the bottle collapsed. The coated bottle shows no immediate attack by the gasoline, and after 25 hours at room temperature minor crazing is noticed and no deformation is observed. After 50 hours' exposure to gasoline, a hole about 1/16 inch in diameter appears in the bottle.

EXAMPLE 5

A plurality of sheets of the material employed in Example 2 are coated with the coating solution of Example 2 and placed in a testing apparatus wherein the test strips are subjected to a tensile stress of 800 pounds per square inch while each of the strips is coated on both sides with butter. The test is carried out at room temperature and each determination is run in triplicate. The results are as follows: the sheet without coating requires an average time of 14 minutes before rupture. The sheet coated with 10 milligrams per square foot requires 23 minutes before rupture. The sheet coated with 20 milligrams per square foot requires 28 minutes to rupture and the sheet coated with 40 milligrams per square foot requires 42 minutes to rupture.

EXAMPLE 6

The impact polystyrene sheet of Example 2 is coated with the solution employed in Example 2 to provide a dry coating weight of about 110 milligrams per square foot and air dried. The coated specimen and an uncoated specimen are spray painted with a gloss black lacquer containing ester solvent sold under the trade name "Sprayon #177." On drying of the lacquered samples, the uncoated sample is dull and pitted, whereas the coated surface shows an acceptable gloss.

EXAMPLE 7

The impact polystyrene sheet as employed in Example 2 is coated with a variety of coating solutions and after drying is spray painted with a gloss black lacquer as in Example 6. The results are set forth in Table III.

TABLE III

| Number | Concentration of polymer in solution for coating | Coating weight* | Appearance of painted surface |
|---|---|---|---|
| 1 | No coating—control | | Poor (dull and pitted) |
| 2 | 5% in A¹ | 120 | Good (good gloss). |
| 3 | 5% in B² | 120 | Good. |
| 4 | 5% in C³ | 120 | Fair (slightly dull). |
| 5 | 5% in D⁴ | 120 | Good. |
| 6 | 5% in E⁵ | 120 | Do. |
| 7 | 5% in F⁶ | 120 | Do. |

*See footnotes at end of Table II.

In a manner similar to the foregoing examples, a wide variety of articles prepared from alkenyl aromatic resins are protected from substances having a deleterious effect thereon by the application of water soluble vinyl aromatic-maleic anhydride or vinyl alkyl ether copolymer salts as a surface coating, or mixtures thereof. Such polymers include the water soluble potassium, sodium and ammonium salts of 1:1 molar chlorostyrene-maleic anhydride polymers; 60:40 molar α-methyl styrene-maleic anhydride polymer; 55:45 molar vinyl toluene (mixed isomers)-maleic anhydride polymer; 1:1 molar butyl vinyl ether-maleic anhydride polymer and the like.

As is apparent from the foregoing specification, the present invention is susceptible of being embodied with various alterations and modifications which may differ particularly from those that have been described in the preceding specification and description.

What is claimed is:

1. An improved, solvent resistant alkenyl aromatic resinous shaped article, the article being sheet, film, injection molded, or foam, the article having
   a surface and having disposed on at least a portion of the surface thereof and adhering thereto
   a continuous coating of a water soluble material selected from the group consisting of monovinyl aromatic-maleic anhydride copolymer salt, vinyl alkyl ether-maleic anhydride copolymer salt, and mixtures thereof, wherein the coating weight of the salt is from about 10 to about 150 milligrams per square foot of substrate.

2. The article of claim 1 wherein the article is a sheet.

3. The article of claim 1 wherein the alkenyl aromatic resin is a styrene polymer.

4. The article of claim 3 wherein the article is polystyrene.

5. The article of claim 3 wherein the article is a polystyrene containing about five percent rubber.

6. The article of claim 1 including an organic material normally deleterious to the alkenyl aromatic resin in contact with the monovinyl aromatic-maleic anhydride copolymer salt.

7. The article of claim 1 wherein the monovinyl aromatic maleic anhydride copolymer salt is a salt of a copolymer of styrene and maleic anhydride.

8. The article of claim 1 wherein the copolymer is a copolymer of vinyl methyl ether and maleic anhydride.

References Cited

UNITED STATES PATENTS

| | | | |
|---|---|---|---|
| 3,084,070 | 4/1963 | Teot | 117—138.8 UA |
| 3,161,538 | 12/1964 | Azorlosa et al. | 117—138.8 UA |
| 3,185,588 | 5/1965 | Resnick | 117—138.8 UA |
| 3,231,415 | 1/1966 | Grenley et al. | 117—138.8 UA |
| 3,486,918 | 12/1969 | Motter | 117—161 UC |

WILLIAM D. MARTIN, Primary Examiner

R. HUSACK, Assistant Examiner

U.S. Cl. X.R.

117—63, 76 F, 87, 90, 95, 138.8 UA, 161 UC